(12) United States Patent
Atienza

(10) Patent No.: US 11,108,047 B2
(45) Date of Patent: Aug. 31, 2021

(54) CONDUCTIVE POLYMER MATERIAL FOR SOLID-STATE BATTERY

(71) Applicant: Nissan North America, Inc., Franklin, TN (US)

(72) Inventor: Dianne Atienza, Waterford, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 217 days.

(21) Appl. No.: 16/263,520

(22) Filed: Jan. 31, 2019

(65) Prior Publication Data

US 2020/0251737 A1    Aug. 6, 2020

(51) Int. Cl.
| | |
|---|---|
| *H01M 10/052* | (2010.01) |
| *H01M 4/60* | (2006.01) |
| *H01M 4/38* | (2006.01) |
| *H01M 4/58* | (2010.01) |
| *H01B 1/12* | (2006.01) |
| *C08L 65/00* | (2006.01) |
| *H01M 4/02* | (2006.01) |

(52) U.S. Cl.
CPC .......... *H01M 4/608* (2013.01); *C08L 65/00* (2013.01); *H01B 1/127* (2013.01); *H01M 4/382* (2013.01); *H01M 4/5815* (2013.01); *H01M 10/052* (2013.01); *C08L 2203/20* (2013.01); *H01M 2004/027* (2013.01); *H01M 2004/028* (2013.01)

(58) Field of Classification Search
CPC .. H01M 10/0525; H01M 4/608; H01M 4/382; H01M 4/5815; H01M 10/052; H01M 2004/027; H01M 2004/028; H01B 1/127; C08L 65/00; C08L 2203/20
See application file for complete search history.

(56) References Cited

U.S. PATENT DOCUMENTS

| | | | |
|---|---|---|---|
| 5,367,041 A | 11/1994 | Wudl et al. | |
| 2011/0311881 A1* | 12/2011 | Benicewicz | H01G 9/038 429/309 |
| 2015/0333331 A1* | 11/2015 | Johnson | H01M 4/608 429/213 |

OTHER PUBLICATIONS

H. Ohno et al., "A new type of polymer gel electrolyte: zwitterionic liquid/polar polymer mixture", Electrochimica Acta 48 (2003), pp. 2079-2083, Tokyo Japan.

Y. Takeda et al., "Developments of the Advanced All-Solid-State Polymer Electrolyte Lithium Secondary Battery", Electrochemistry 77, No. 9 (2009), pp. 784-797, Mie Tokyo.

(Continued)

*Primary Examiner* — Milton I Cano
*Assistant Examiner* — Jenna Shulman
(74) *Attorney, Agent, or Firm* — Global IP Counselors, LLP

(57) ABSTRACT

A conductive polymer material is provided that includes an electrically conducting monomer and a zwitterionic sulfate chemically attached to the monomer. The electrically conducting monomer is at least one of acetylene, pyrrole, thiophene, phenylenevinylene, paraphenylene and aniline. The zwitterionic sulfonate includes an imidazolium group or an ammonium group. A solid-state battery is also provided that includes the conductive polymer material in an electrode. The solid-state battery includes an anode, a cathode and a solid electrolyte disposed between the anode and the cathode. At least one of the anode and the cathode includes the conductive polymer material.

24 Claims, 2 Drawing Sheets

(56) References Cited

OTHER PUBLICATIONS

D. Naegele et al., "Electrically conductive polymers as rechargeable battery electrodes", Solid State Ionics, vol. 28-30, Part 2, Sep. 1988, pp. 983-989, Germany.
M. Liu et al., "High-performance solid polymer electrolytes for lithium ion batteries based on sulfobetaine zwitterion and poly (ethylene oxide) modified polysiloxane", Journal of Alloys and Compounds 742 (2018), pp. 619-628, PR China.
M. Yoshizawa, "Ion conduction in zwitterionic-type molten salts and their polymers", Journal of Materials Chemistry 11 (2001), pp. 1057-1062, Tokyo Japan.
F. Lu et al., "Lithium-Containing Zwitterionic Poly(Ionic Liquid)s as Polymer Electrolytes for Lithium-Ion Batteries", The Journal of Physical Chemistry C, Aug. 2017, pp. 17756-17763, American Chemical Society, PR China.
C. Barbero et al., "Novel synthetic methods to produce functionalized conducting polymers I. Polyanilines", Electrochimica Acta 49 (2004), pp. 3671-3686, Elsevier Ltd., Rio Cuarto Argentina.
L. Long et al., "Polymer electrolytes for lithium polymer batteries", Journal of Materials Chemistry A (2016), pp. 10038-10069, The Royal Society of Chemistry, PR China.
A. Narita et al., "Structural factors to improve physico-chemical properties of zwitterions as ion conductive matrices", Journal of Materials Chemistry 16 (2006), pp. 1475-1482, The Royal Society of Chemistry, Tokyo Japan.
C. Tiyapiboonchaiya et al., "The zwitterion effect in high-conductivity polyelectrolyte materials", nature materials vol. 3 (Jan. 2004), pp. 29-32, Nature Publishing Group, Victoria Australia.

* cited by examiner

CONDUCTIVE POLYMER MATERIAL FOR SOLID-STATE BATTERY

BACKGROUND

Field of The Invention

The present invention generally relates to a conductive polymer material for a solid-state battery, and a solid-state battery including an electrode comprising the conductive polymer material.

Background Information

Batteries that include lithium metal anodes are desirable because they have a high energy density and, thus, can generate a large amount of power with a relatively thin anode, thus permitting a reduction in the size of the battery as compared with other conventional anodes made of carbon or silicon. Conventional batteries using lithium metal anodes typically employ highly abundant sulfur as a cathode active material.

SUMMARY

However, it has been discovered that there are several drawbacks with lithium metal anodes and sulfur cathodes. For example, lithium metal anodes have a limited current density due to low lithium diffusion rate and are susceptible to dendrite formation during repeated charging and discharging of the battery. Furthermore, the performance of lithium anodes is limited due to the lithium volume change and the consequent increase in the contact resistance between the lithium and electrolyte during the discharge cycle. Similar behavior also occurs in the cathode, wherein the insulating nature and the volume changes of sulfur during cycling resulted to the decrease in the reversibility of the sulfur electrochemistry and mechanical integrity of the cathode.

In order to improve the energy storage capacity of batteries, solid-state batteries have been developed that use a solid or polymer electrolyte to facilitate the conduction of lithium ions between the anode and cathode. Solid-state batteries allow for a much smaller battery size due to their improved energy capacity. However, lithium dendrite formation is still problematic in solid-state batteries. Moreover, solid-state batteries have an increased contact resistance between the active materials and the electrolyte due to the volume changes during the charge and discharge cycles of the battery.

Therefore, further improvement is needed to mitigate the issues associated with the low lithium diffusion rate and volume changes of the anode and cathode. In particular, it is desirable to increase the diffusion of lithium ions between the anode and cathode and decrease the contact resistance between the anode and the electrolyte.

It has been discovered that the diffusion of lithium ions between the anode and cathode can be improved using a conductive polymer material that includes an electrically conducting polymer and a zwitterionic salt.

In particular, it has been discovered that a conductive polymer material which has both an electrically conducting polymer backbone and an ionically conducting polymer backbone in the form of a zwitterionic salt can be incorporated in one of the electrodes of the battery to improve the conduction of lithium ions between the anode and cathode.

Therefore, it is desirable to provide a solid polymer electrolyte battery that includes such a conductive polymer material.

In view of the state of the known technology, one aspect of the present disclosure is to provide a conductive polymer material. The conductive polymer material includes an electrically conducting monomer and a zwitterionic sulfonate chemically attached to the electrically conducting monomer. The electrically conducting monomer is selected from the group consisting of: acetylene, pyrrole, thiophene, phenylenevinylene, paraphenylene and aniline. The zwitterionic sulfonate includes an imidazolium group or an ammonium group.

Another aspect of the present disclosure is to provide a battery including a conductive polymer material. The battery includes a cathode, an anode, and a solid electrolyte disposed between the cathode and the anode, in which at least one of the cathode and the anode includes a conductive polymer material. The conductive polymer material includes an electrically conducting monomer and a zwitterionic sulfonate chemically attached to the electrically conducting monomer. The electrically conducting monomer is selected from the group consisting of: acetylene, pyrrole, thiophene, phenylenevinylene, paraphenylene and aniline. The zwitterionic sulfonate includes an imidazolium group or an ammonium group.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
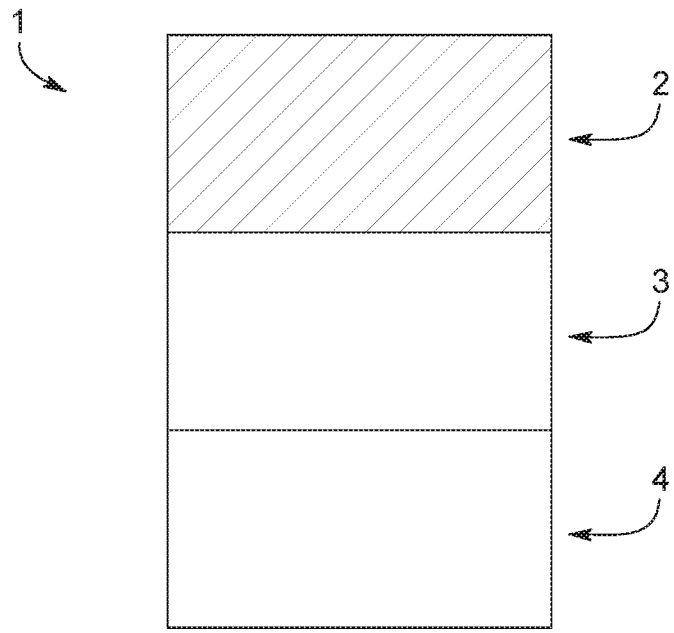
FIG. 1 is a schematic view of a solid polymer electrode battery according to one embodiment.

Referring initially to FIG. 1, a solid-state battery 1 is illustrated that includes a cathode 2, an electrolyte 3, and an anode 4 in accordance with a first embodiment. The solid-state battery 1 can be incorporated in a vehicle, a mobile device, a laptop computer or other suitable personal electronic devices.

The cathode 2 includes a cathode active material and a conductive polymer material. The cathode 2 can also include an additive and a binder. The cathode 2 includes 75-94 percent by weight of the cathode active material, 1-20 percent by weight of the conductive polymer material, and up to five percent by weight of the additive plus the binder. For example, the cathode 2 preferably includes two percent by weight of the additive and three percent by weight of the binder.

The cathode 2 can be formed by mixing the cathode active material, the conductive polymer material, the additive and the binder with a suitable solvent, such as N-methyl pyrrolidone (NMP). The weight ratio of the solvent to the sum of the cathode active material, the conductive polymer material, the additive and the binder can be any suitable value and is preferably 2:1. The electrode components can also be mixed using solvent-free techniques, such as ball milling.

The cathode active material can be any cathode active material that is suitable for use in a solid-state lithium battery. For example, the cathode active material can include sulfur, such as sulfur coated with carbon, sulfur coated with a polymer, sulfur particles coated with graphene, sulfur encapsulated by carbon fibers, nanoparticles of sulfur and titanium dioxide, iron disulfide, iron sulfide, copper sulfide, lead sulfide, and any combination thereof. The cathode active material can also include a material comprising at least one of nickel, cobalt or manganese. For example, the cathode active material can include an oxide of at least one of nickel, cobalt or manganese, such as manganese dioxide or nickel manganese oxide. The cathode active material preferably includes sulfur.

The binder can be any suitable electrode binder material. For example, the binder can include polyvinylidene fluoride, styrene-butadiene rubber, a cellulose material or any combination thereof. The additive can be any suitable electrode additive, such as a carbon material or a conductive metal, and preferably includes a carbon material.

The conductive polymer material includes an electrically conducting monomer and a zwitterionic salt chemically attached to the electrically conducting monomer. The zwitterionic salt is a zwitterionic sulfonate (such as a sulfobetaine), a carboxybetaine, or a zwitterionic phosphorylcholine.

The conductive polymer material comprises an equimolar amount of the electrically conducting monomer and the zwitterionic salt. The conductive polymer material further includes at least an equimolar amount of at least one lithium salt, such as lithium trifluorosulfonylimide (LiTFSI), lithium bis(fluorosulfonyl)imide (LiFSI), lithium hexafluorophosphate (LiPF$_6$), lithium tetrafluoroborate (LiBF$_4$), lithium bis(oxalato)borate (LiBOB), or lithium difluorooxalato borate (LiDFOB) relative to the amount of the conductive polymer comprising the electrically conducting monomer and the zwitterionic salt.

The electrically conducting monomer has an electronic conductivity of 0.001-100 S/cm. For example, the electrically conducting monomer includes at least one of acetylene, pyrrole, thiophene, phenylenevinylene, paraphenylene and aniline.

The zwitterionic salt can be a sulfobetaine as shown in formula (1) below, where R is an alkane having one to five carbon atoms and n ranges from one to five, a carboxybetaine as shown in formula (2) below, where R is an alkane having one to five carbon atoms and n ranges from one to five, or a zwitterionic phosphorylcholine as shown in formula (3) below, where R is an alkane having one to five carbon atoms and n ranges from one to five:

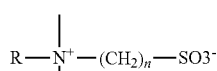

(1)

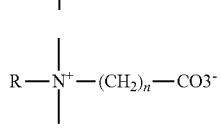

(2)

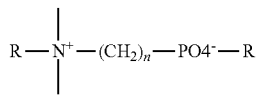

(3)

The zwitterionic salt preferably includes a sulfonate group and is used in the powder form. The zwitterionic salt preferably has an ionic conductivity of greater than $10^{-7}$ S/cm. For example, the zwitterionic salt can be a betaine that includes imidazolium or ammonium group as a cationic moiety and a sulfonate as an anionic moiety. The zwitterionic salt is preferably a sulfobetaine having an imidazolium group or an ammonium group. The zwitterionic salt can be formed as shown below, where R is an alkane comprising one to three carbon atoms:

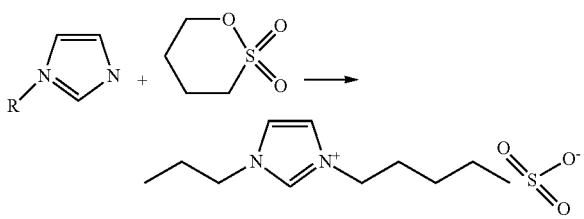

The zwitterionic sulfonate can be functionalized in various locations on the electrically conducting monomer. For example, when the electrically conducting monomer is pyrrole, the zwitterionic sulfonate can be functionalized in the N or beta (β) position of the pyrrole. For example, the zwitterionic sulfonate can be 1-butylimidazolium-3-(n-butanesulfonate) or a quaternary ammonium sulfonate functionalized at either the N or β position of the pyrrole as shown below, where R is an alkane comprising one to five carbon atoms and n ranges from one to five:

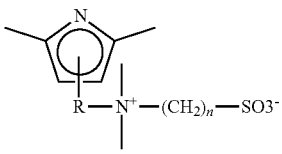

Alternatively, the zwitterionic sulfonate can be an ammonium-based sulfonate functionalized at the β position of the pyrrole as shown below:

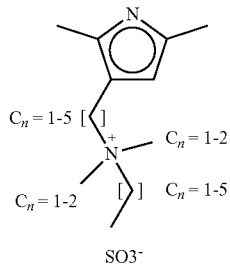

The zwitterionic sulfonate can also be an ammonium-based sulfonate functionalized in the N position of the pyrrole as shown below:

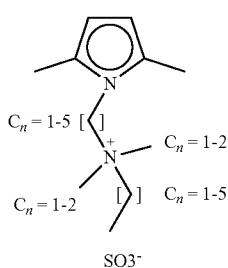

When the electrically conducting monomer is aniline, the zwitterionic sulfonate can be functionalized in the aniline via carbanions. For example, the zwitterionic sulfonate can be a quaternary ammonium sulfonate functionalized in the aniline as shown below, where R is an alkane comprising one to five carbon atoms and n ranges from one to five:

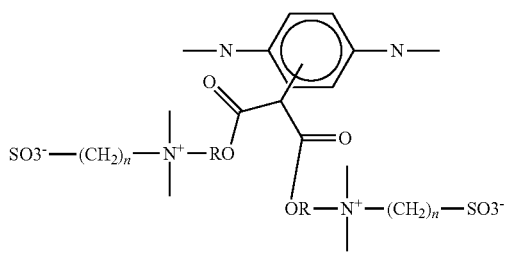

In particular, the zwitterionic sulfonate can be a quaternary ammonium sulfonate functionalized in the aniline as shown below, where n ranges from one to five:

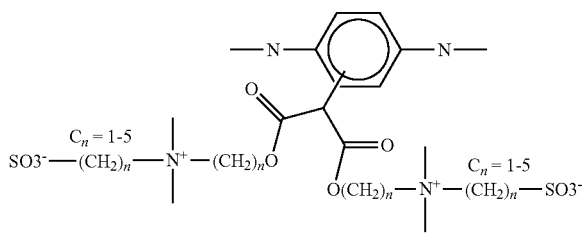

The conductive polymer can also include a second electrically conducting monomer with a second zwitterionic salt chemically attached thereto. The second electrically conducting monomer can be the same as or different from the electrically conducting monomer. For example, the second electrically conducting monomer includes at least one of acetylene, pyrrole, thiophene, phenylenevinylene, paraphenylene and aniline. The second zwitterionic salt can be the same as or different from the zwitterionic salt. For example, the second zwitterionic salt can be a sulfobetaine, a carboxybetaine, or a zwitterionic phosphorylcholine. At least one of the second electrically conducting monomer and the second zwitterionic salt is different from, respectively, the electrically conducting monomer and the zwitterionic salt.

The electrolyte 3 is a solid polymer electrolyte. The solid polymer electrolyte can be any suitable electrolyte that includes a polymer having ion transport properties. For example, the solid polymer can be an electrolyte dissolved in a polymer matrix. The electrolyte can include at least one lithium salt, such as LiTFSI, LiFSI, $LiPF_6$, $LiBF_4$, LiBOB, or LiDFOB. The electrolyte preferably includes LiTFSI as zwitterion salts have some solubility in LiTFSI. The polymer matrix can be any suitable polymer matrix. For example, the polymer matrix can include a polyalkyleneoxide (PEO) such as polyethylene oxide (PEO). The polymer matrix can also include a siloxane. The electrolyte 3 preferably does not include any conductive polymer material, as such conductive polymer material is electrically conductive and can therefore short circuit the battery 1 if incorporated in the electrolyte 3.

The anode 4 includes an anode active material. The anode 4 can also include a binder and an additive. The anode active material includes lithium metal or alloys of lithium such as lithiated magnesium, silver, zinc, aluminum, silicon, tin, lead, antimony, and/or bismuth. The anode 4 preferably includes 90-95 percent by weight of the anode active material and five to ten percent by weight of the additive plus the binder. For example, the anode 4 can include 94.5 percent by weight of the anode active material, three percent by weight of the additive and 2.5 percent by weight of the binder.

The anode 4 can be formed by mixing the anode active material, the additive and the binder with a suitable solvent, such as N-methyl pyrrolidone (NMP). The weight ratio of the solvent to the sum of the anode active material, the additive and the binder can be any suitable value and is preferably 2:1. Solvent-free and deposition techniques such as ball milling and sputter deposition can also be used in preparing the anode active material.

As with the cathode 2, the binder of the anode 4 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

Figure 2:
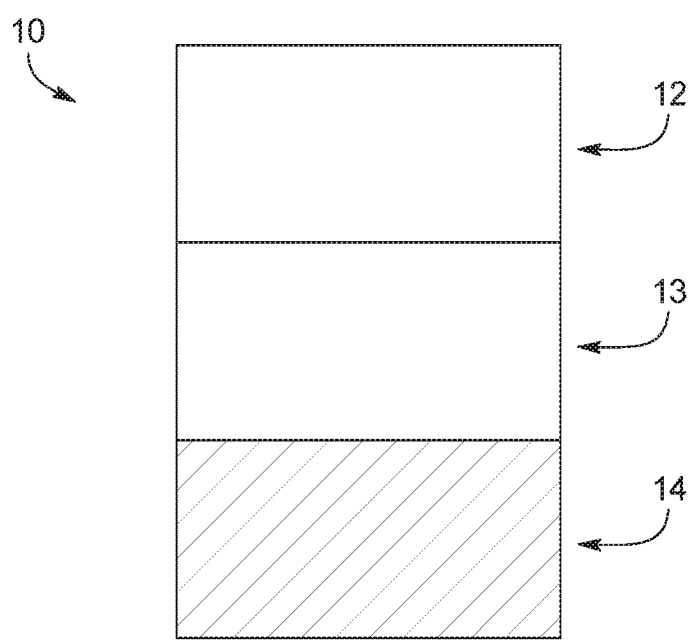
FIG. 2 is a schematic view of a solid polymer electrolyte battery according to a second embodiment.

FIG. 2 shows a solid-state battery 10 that includes a cathode 12, an electrolyte 13, and an anode 14 in accordance with a second embodiment. Like the solid-state battery 1 of the first embodiment, the solid-state battery 10 can be incorporated in a vehicle, a mobile device, a laptop computer or other suitable personal electronic devices.

The cathode 12 includes a cathode active material. The cathode 12 can also include an additive and a binder. The cathode 12 preferably includes 90-95 percent by weight of the cathode active material and five to ten percent by weight of the additive plus the binder. For example, the cathode 12 can include 94.5 percent by weight of the cathode active material, three percent by weight of the additive and 2.5 percent by weight of the binder.

The cathode 12 can be formed by mixing the cathode active material, the additive and the binder with a suitable solvent, such as N-methyl pyrrolidone (NMP). The weight ratio of the solvent to the sum of the cathode active material, the additive and the binder can be any suitable value and is preferably 2:1.

As in the first embodiment, the binder of the cathode 12 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

The cathode active material can be any cathode active material that is suitable for use in a solid-state lithium battery. For example, the cathode active material can include sulfur, such as sulfur coated with carbon, sulfur coated with a polymer, sulfur particles coated with graphene, sulfur encapsulated by carbon fibers, nanoparticles of sulfur and titanium dioxide, iron disulfide, iron sulfide, copper sulfide, lead sulfide, and any combination thereof. The cathode active material can also include a material comprising at least one of nickel, cobalt or manganese. For example, the cathode active material can include an oxide of at least one of nickel, cobalt or manganese, such as manganese dioxide. The cathode active material preferably includes sulfur.

The electrolyte 13 is a solid polymer electrolyte. As in the first embodiment, the solid polymer electrolyte of the second embodiment can be any suitable electrolyte that includes a polymer having ion transport properties. For example, the solid polymer electrolyte can be an electrolyte dissolved in a polymer matrix. The electrolyte can include at least one lithium salt, such as LiTFSI, LiFSI, $LiPF_6$, $LiBF_4$, LiBOB, or LiDFOB. The electrolyte preferably includes LiTFSI as zwitterion salts have some solubility in LiTFSI. The polymer matrix can be any suitable polymer matrix. For example, the polymer matrix can include a polyalkyleneoxide such as polyethylene oxide (PEO). The polymer matrix can also include a siloxane. The electrolyte 13 preferably does not include any conductive polymer material, as such conductive polymer material is electrically conductive and can therefore short circuit the battery 10 if incorporated in the electrolyte 13.

The anode 14 includes an anode active material and a conductive polymer material. The anode 14 can also include an additive and a binder. The anode 14 includes 75-94 percent by weight of the anode active material, 1-20 percent by weight of the conductive polymer material, and up to five percent by weight of the additive plus the binder. For example, the anode 14 preferably includes two percent by weight of the additive and three percent by weight of the binder. The anode active material includes lithium metal or alloys of lithium such as lithiated magnesium, silver, zinc, aluminum, silicon, tin, lead, antimony, and/or bismuth.

The anode 14 can be formed by mixing the anode active material, the conductive polymer material, the additive and the binder with a suitable solvent, such as N-methyl pyrrolidone (NMP). The weight ratio of the solvent to the sum of the anode active material, the conductive polymer material, the additive and the binder can be any suitable value and is preferably 2:1. Solvent-free and deposition techniques such as ball milling and sputter deposition can also be used in preparing the anode active material.

As with the cathode 12, the binder of the anode 14 can be any suitable electrode binder material. For example, the binder can include polyvinylidene fluoride, styrene-butadiene rubber, a cellulose material or any combination thereof. The additive can be any suitable electrode additive, such as a carbon material or a conductive metal, and preferably includes a carbon material.

The conductive polymer material in the second embodiment can have the same composition as the conductive polymer material in the solid-state battery 1 of the first embodiment.

Figure 3:
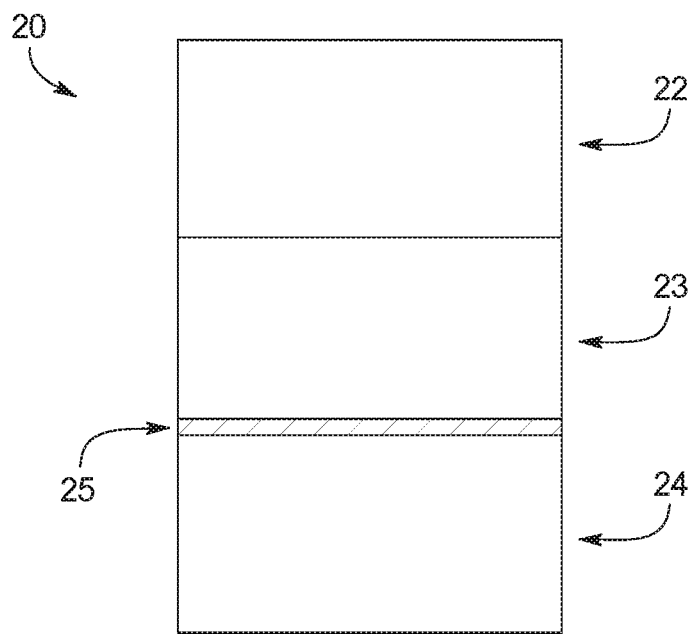
FIG. 3 is a schematic view of a solid polymer electrolyte battery according to a third embodiment.

FIG. 3 shows a solid-state battery 20 that includes a cathode 22, an electrolyte 23, an anode 24, and a protective layer 25 between the anode 24 and the electrolyte 23 in accordance with a third embodiment. Like the solid-state battery 1 of the first embodiment and the solid-state battery 10 of the second embodiment, the solid-state battery 20 can be incorporated in a vehicle, a mobile device, a laptop computer or other suitable personal electronic devices.

The cathode 22 includes a cathode active material. The cathode 22 can also include an additive and a binder. The cathode 22 preferably includes 90-95 percent by weight of the cathode active material and five to ten percent by weight of the additive plus the binder. For example, the cathode 22 can include 94.5 percent by weight of the cathode active material, three percent by weight of the additive and 2.5 percent by weight of the binder.

The cathode 22 can be formed by mixing the cathode active material, the additive and the binder with a suitable solvent, such as N-methyl pyrrolidone (NMP). The weight ratio of the solvent to the sum of the cathode active material, the additive and the binder can be any suitable value and is preferably 2:1.

As in the first and second embodiments, the binder of the cathode 22 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

The cathode active material can be any cathode active material that is suitable for use in a solid-state lithium battery. For example, the cathode active material can include sulfur, such as sulfur coated with carbon, sulfur coated with a polymer, sulfur particles coated with graphene, sulfur encapsulated by carbon fibers, nanoparticles of sulfur and titanium dioxide, iron disulfide, iron sulfide, copper sulfide, lead sulfide, and any combination thereof. The cathode active material can also include a material comprising at least one of nickel, cobalt or manganese. For example, the cathode active material can include an oxide of at least one of nickel, cobalt or manganese, such as manganese dioxide. The cathode active material preferably includes sulfur.

The electrolyte 23 is a solid polymer electrolyte. As in the first and second embodiments, the solid polymer electrolyte of the third embodiment can be any suitable electrolyte that includes a polymer having ion transport properties. For example, the solid polymer electrolyte can be an electrolyte dissolved in a polymer matrix. The electrolyte can include at least one lithium salt, such as LiTFSI, LiFSI, $LiPF_6$, $LiBF_4$, LiBOB, or LiDFOB. The electrolyte preferably includes LiTFSI as zwitterion salts have some solubility in LiTFSI. The polymer matrix can be any suitable polymer matrix. For example, the polymer matrix can include a polyalkyleneoxide such as polyethylene oxide (PEO). The polymer matrix can also include a siloxane. The electrolyte 23 preferably does not include any conductive polymer material, as such conductive polymer material is electrically conductive and can therefore short circuit the battery 20 if incorporated in the electrolyte 23.

The anode 24 includes an anode active material. The anode 24 can also include a binder and an additive. The anode active material includes lithium metal or alloys of lithium such as lithiated magnesium, silver, zinc, aluminum, silicon, tin, lead, antimony, and/or bismuth. The anode 24 preferably includes 90-95 percent by weight of the anode active material and five to ten percent by weight of the additive plus the binder. For example, the anode 24 can include 94.5 percent by weight of the anode active material, three percent by weight of the additive and 2.5 percent by weight of the binder.

The anode 24 can be formed by mixing the anode active material, the additive and the binder with a suitable solvent, such as N-methyl pyrrolidone (NMP). The weight ratio of the solvent to the sum of the anode active material, the additive and the binder can be any suitable value and is preferably 2:1. Solvent-free and deposition techniques such as ball milling and sputter deposition can also be used in preparing the anode active material.

As with the cathode 22, the binder of the anode 24 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

The protective layer 25 includes a conductive polymer material. The conductive polymer material in the third embodiment can have the same composition as the conductive polymer material in the solid-state battery 1 of the first embodiment.

Figure 4:
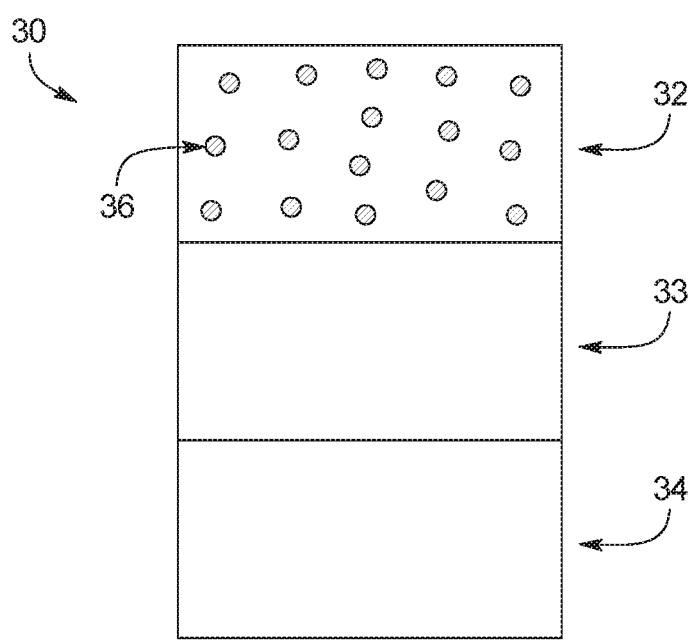
FIG. 4 is a schematic view of a solid polymer electrolyte battery according to a modification of the first embodiment.

FIG. 4 shows a solid-state battery 30 that includes a cathode 32, an electrolyte 33, an anode 34, and cathode active material particles 36 in accordance with a modification of the first embodiment. Like the solid-state battery 1 of the first embodiment, the solid-state battery 30 can be incorporated in a vehicle, a mobile device, a laptop computer or other suitable personal electronic devices.

The cathode 32 includes a cathode active material. The cathode 32 can also include an additive and a binder. The cathode 32 preferably includes 90-95 percent by weight of the cathode active material and five to ten percent by weight of the additive plus the binder. For example, the cathode 32 can include 94.5 percent by weight of the cathode active material, three percent by weight of the additive and 2.5 percent by weight of the binder.

The cathode 32 can be formed by mixing the cathode active material, the additive and the binder with a suitable solvent, such as N-methyl pyrrolidone (NMP). The weight ratio of the solvent to the sum of the cathode active material, the additive and the binder can be any suitable value and is preferably 2:1.

As in the first and second embodiments, the binder of the cathode 32 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

The cathode active material includes cathode active material particles 36. The cathode active material particles 36 are coated with a conductive polymer material. The cathode active material particle 36 can be formed of any cathode active material that is suitable for use in a solid-state lithium battery. For example, the cathode active material particles 36 can be formed of sulfur, nanoparticles of sulfur and titanium dioxide, iron disulfide, iron sulfide, copper sulfide, lead sulfide, and any combination thereof, and/or a material comprising at least one of nickel, cobalt or manganese. The cathode active material particles 36 are preferably formed of sulfur. The conductive polymer coating the cathode active material particles 36 can have the same composition as the conductive polymer material in the solid-state battery 1 of the first embodiment.

The electrolyte 33 is a solid polymer electrolyte. As in the first embodiment, the solid polymer electrolyte can be any suitable electrolyte that includes a polymer having ion transport properties. For example, the solid polymer can be an electrolyte dissolved in a polymer matrix. The electrolyte can include at least one lithium salt, such as LiTFSI, LiFSI, LiPF$_6$, LiBF$_4$, LiBOB, or LiDFOB. The electrolyte preferably includes LiTFSI as zwitterion salts have some solubility in LiTFSI. The polymer matrix can be any suitable polymer matrix. For example, the polymer matrix can include a polyalkyleneoxide such as polyethylene oxide (PEO). The polymer matrix can also include a siloxane. The electrolyte 33 preferably does not include any conductive polymer material, as such conductive polymer material is electrically conductive and can therefore short circuit the battery 30 if incorporated in the electrolyte 33.

The anode 34 includes an anode active material. The anode 34 can also include a binder and an additive. The anode active material includes lithium metal or alloys of lithium such as lithiated magnesium, silver, zinc, aluminum, silicon, tin, lead, antimony, and/or bismuth. The anode 34 preferably includes 90-95 percent by weight of the anode active material and five to ten percent by weight of the additive plus the binder. For example, the anode 34 can include 94.5 percent by weight of the anode active material, three percent by weight of the additive and 2.5 percent by weight of the binder.

The anode 34 can be formed by mixing the anode active material, the additive and the binder with a suitable solvent, such as N-methyl pyrrolidone (NMP). The weight ratio of the solvent to the sum of the anode active material, the additive and the binder can be any suitable value and is preferably 2:1. Solvent-free and deposition techniques such as ball milling and sputter deposition can also be used in preparing the anode active material.

As with the cathode 32, the binder of the anode 34 can be any suitable electrode binder material. For example, the binder can include polyvinylidene fluoride, styrene-butadiene rubber, a cellulose material or any combination thereof. The additive can also be any suitable electrode additive, such as a carbon material or a conductive metal, and preferably includes a carbon material.

GENERAL INTERPRETATION OF TERMS

In understanding the scope of the present invention, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A conductive polymer material comprising:
a plurality of electrically conducting monomers, each of the plurality of electrically conducting monomers selected from the group consisting of: acetylene, pyrrole, thiophene, phenylenevinylene, paraphenylene and aniline; and a zwitterionic sulfonate chemically attached to each of the plurality of electrically conducting monomers, the zwitterionic sulfonate including an imidazolium group or an ammonium group.

2. The conductive polymer material according to claim 1, wherein
the conductive polymer material comprises 10 wt % or less of the zwitterionic sulfonate.

3. The conductive polymer material according to claim 1, wherein
the conductive polymer material comprises an equimolar amount of the plurality of electrically conducting monomers and the zwitterionic sulfonate.

4. The conductive polymer material according to claim 1, wherein
the plurality of electrically conducting monomers and the zwitterionic sulfonate chemically attached to each of the plurality of electrically conducting monomers form a conductive polymer, and
the conductive polymer material includes at least an equimolar amount of at least one lithium salt relative to an amount of the conductive polymer.

5. The conductive polymer material according to claim 1, wherein
each of the electrically conducting monomers is pyrrole.

6. The conductive polymer material according to claim 1, wherein
the pyrrole is functionalized at a nitrogen position or a β position.

7. The conductive polymer material according to claim 1, wherein
each of the plurality of electrically conducting monomers is aniline.

8. The conductive polymer material according to claim 1, wherein
the zwitterionic sulfonate includes a quaternary ammonium group.

9. A battery comprising:
a cathode;
an anode; and
a solid electrolyte between the cathode and the anode,
at least one of the cathode and the anode including a conductive polymer material, the conductive polymer material comprising:
a plurality of electrically conducting monomers, each of the plurality of electrically conducting monomers selected from the group consisting of: acetylene, pyrrole, thiophene, phenylenevinylene, paraphenylene and aniline; and
a zwitterionic sulfonate chemically attached to each of the plurality of electrically conducting monomers, the zwitterionic sulfonate including an imidazolium group or an ammonium group.

10. The battery according to claim 9, wherein
the conductive polymer material comprises 10 wt % or less of the zwitterionic sulfonate.

11. The battery according to claim 9, wherein
the conductive polymer material comprises an equimolar amount of the plurality of electrically conducting monomers and the zwitterionic sulfonate.

12. The battery according to claim 9, wherein
the plurality of electrically conducting monomers and the zwitterionic sulfonate chemically attached to each of the plurality of electrically conducting monomers form a conductive polymer, and
the conductive polymer material includes at least an equimolar amount of at least one lithium salt relative to an amount of the conductive polymer.

13. The battery according to claim 9, wherein
each of the plurality of electrically conducting monomers is pyrrole.

14. The battery according to claim 9, wherein
the pyrrole is functionalized at a nitrogen position or a β position.

15. The battery according to claim 9, wherein
each of the plurality of electrically conducting monomers is aniline.

16. The battery according to claim 9, wherein
the zwitterionic sulfonate includes a quaternary ammonium group.

17. The battery according to claim 9, wherein
the at least one of the cathode and the anode comprises 20 wt % or less of the conductive polymer material.

18. The battery according to claim 9, wherein
the at least one of the cathode and the anode comprises 1 wt % to 20 wt % of the conductive polymer material.

19. The battery according to claim 9, wherein
the anode comprises lithium metal or alloys of lithium.

20. The battery according to claim 9, wherein
the cathode comprises sulfur.

21. The battery according to claim 9, wherein
the cathode comprises at least one of nickel, cobalt and manganese.

22. The battery according to claim 9, wherein
the at least one of the cathode and the anode includes the conductive polymer material and an electrode active material.

23. The conductive polymer material according to claim 4, wherein each of the plurality of electrically conducting monomers and the zwitterionic sulfonate chemically attached thereto is represented by the following formula:

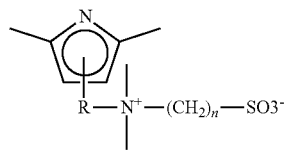

where R is an alkyl group containing 1 to 5 carbon atoms, and n ranges from 1 to 5.

24. The battery according to claim 11, wherein each of the plurality of electrically conducting monomers and the zwitterionic sulfonate chemically attached thereto is represented by the following formula:

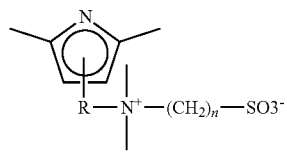

where R is an alkyl group containing 1 to 5 carbon atoms, and n ranges from 1 to 5.

* * * * *